Jan. 18, 1949.  G. R. DEMPSTER ET AL  2,459,506
ELEVATING MECHANISM FOR FIFTH WHEELS
Filed July 15, 1946  3 Sheets-Sheet 1

INVENTORS
George R. Dempster
BY Harry W. Jones.
Cameron, Kerkam & Sutton
Attorneys Jan. 18, 1949. G. R. DEMPSTER ET AL 2,459,506
ELEVATING MECHANISM FOR FIFTH WHEELS
Filed July 15, 1946  3 Sheets-Sheet 3

INVENTORS
George R. Dempster
BY Harry W. Jones.
Cameron, Kerkam & Sutton
Attorneys Patented Jan. 18, 1949

2,459,506

UNITED STATES PATENT OFFICE 2,459,506

ELEVATING MECHANISM FOR FIFTH WHEELS

George R. Dempster and Harry W. Jones, Knoxville, Tenn., assignors to Dempster Brothers, Incorporated, Knoxville, Tenn., a corporation of Tennessee Application July 15, 1946, Serial No. 683,734

10 Claims. (Cl. 298—22)

1

This invention relates to fifth wheel mechanism for tractors of trailer type trucks and more particularly to means for elevating the fifth wheels to dump the trailer.

Heretofore various devices have been proposed for elevating the fifth wheel for tractors to dump the trailer but all of these have had commercially unacceptable features such as unduly complicated mechanical structure or excessive cost of manufacture. None of these devices has provided for movement of the fifth wheel along the chassis of the tractor to permit adjustment of the center of the trailer load on the tractor. Adjustment of the center of the trailer load on the tractor has been found to increase the life of the tractor and reduce costs of maintenance and operation as well as afford increased flexibility of use.

It is accordingly an object of the present invention to provide novel means for elevating the fifth wheel of tractors to dump the trailer which is of simple construction and readily installed on any tractor chassis.

Another object of the present invention is to provide novel elevating means for the fifth wheel of tractors which will permit movement of the fifth wheel along the axis of the chassis of the tractor to permit adjustment of the center of the trailer load on the tractor.

Another object of the present invention is to provide novel means for elevating the fifth wheel of tractors which may be readily operated by untrained personnel.

Other and further objects of the present invention will become apparent as it is hereinafter described.

An illustrative embodiment of the present invention is shown in the accompanying drawings and is described hereinafter. It should be expressly understood that this embodiment is shown and described for the purposes of illustration only and that it is not to be construed as a limitation or definition of the invention. Reference should be made to the appended claims to determine the scope of the present invention.

In the several figures, in which like reference characters designate similar parts:

Fig. 2 is a view as seen looking toward the

Figure 1:
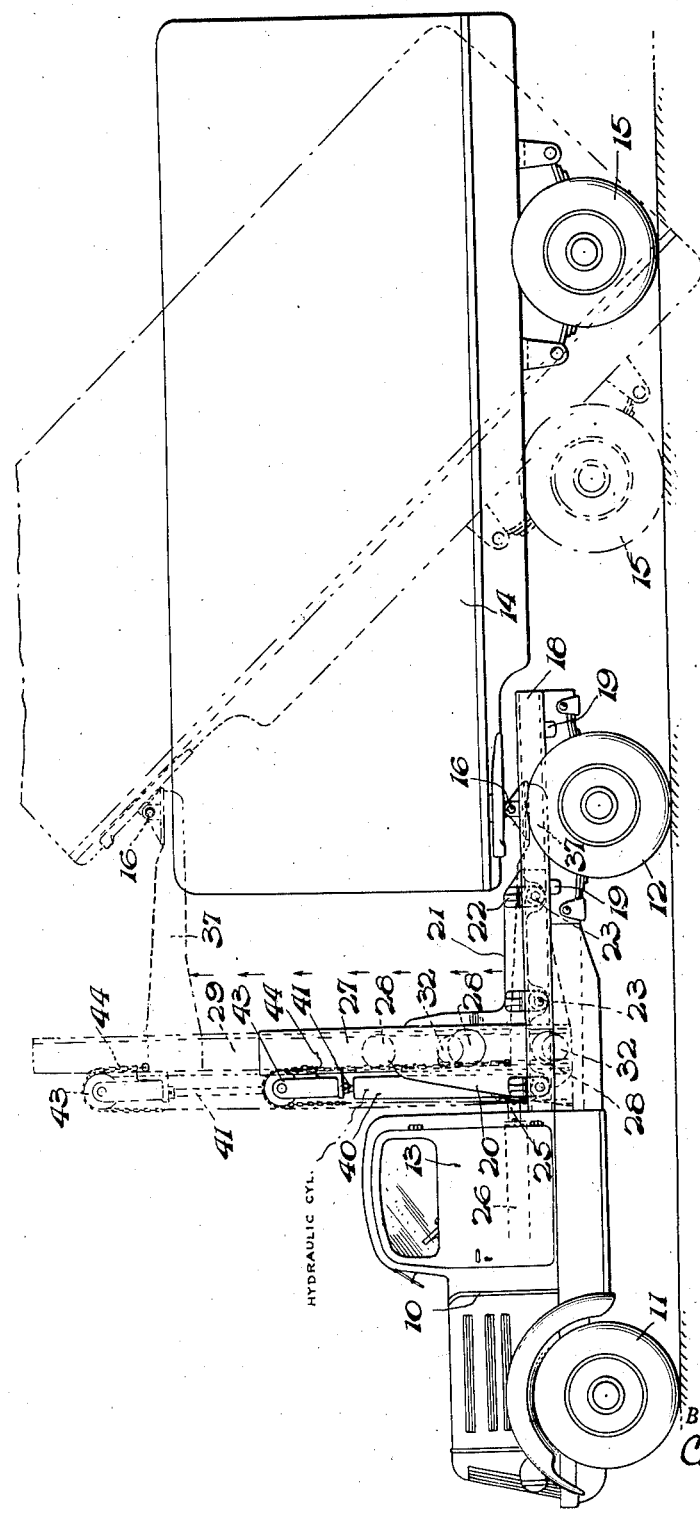
Fig. 1 is a side view of a tractor and trailer type truck with one embodiment of the novel fifth wheel elevating mechanism of the present invention installed thereon and showing in dotted line the elevated and dumping position of the several elements.
Figure 3:
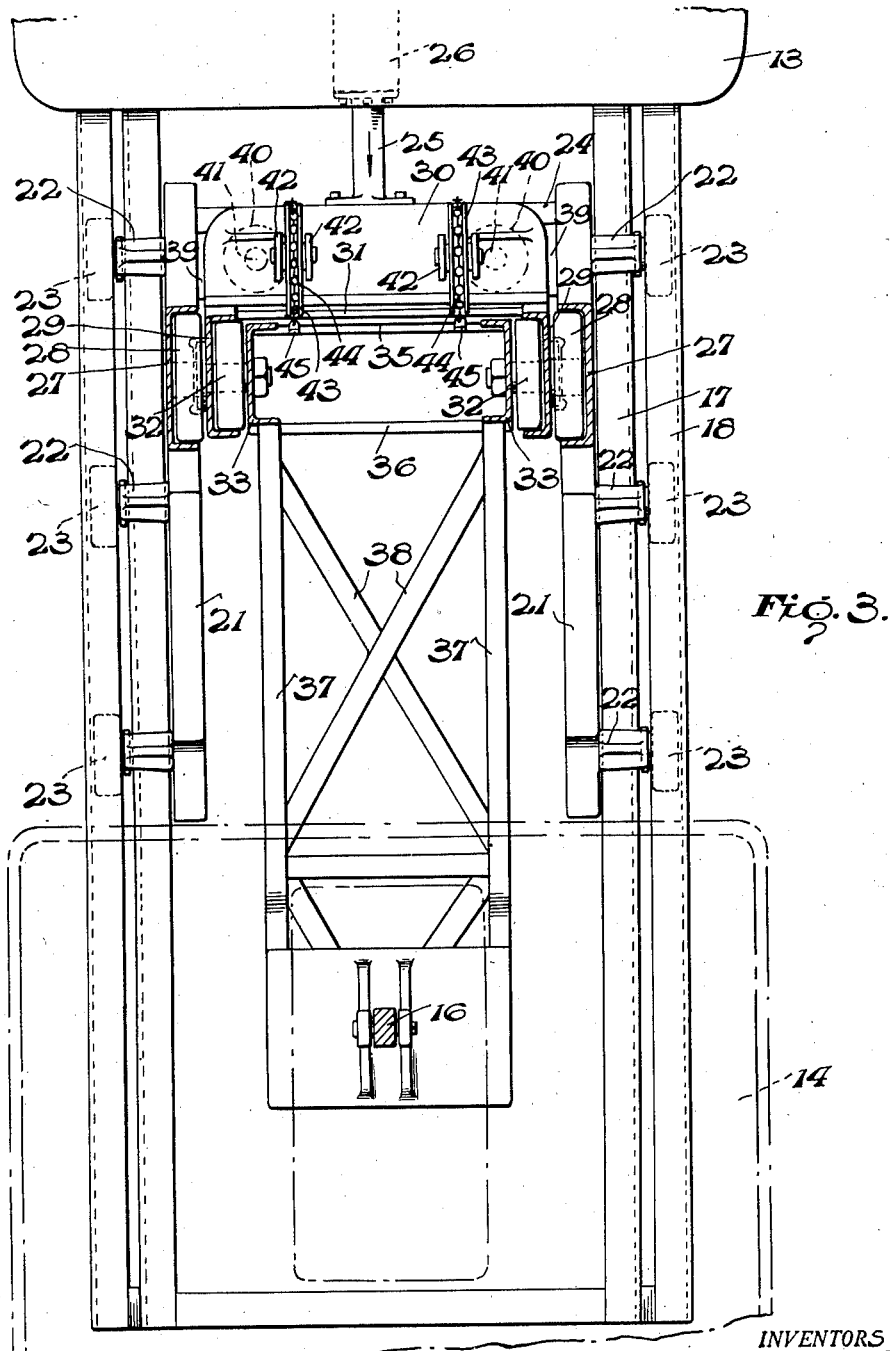

2 rear of the tractor from the cab thereof of the embodiment of the novel fifth wheel elevating mechanism shown in Fig. 1 and illustrating a second means for mounting the elevating mechanism on the tractor; and Fig. 3 is a view, as seen from above, of the novel fifth wheel elevating mechanism shown in Fig. 1 in which a part of the cab of the tractor is seen and a part of the trailer is indicated in dotted lines.

Referring now to the several figures, 10 is any suitable tractor supported on front wheels 11 and rear wheels 12 and equipped with a cab 13. Any suitable trailer 14 may be used with tractor 10 and is supported by wheels 15 at its rear end and on fifth wheel 16 at the tractor. Fifth wheel 16 may be of any suitable construction and is only indicated diagrammatically, and it may be elevated as shown in dotted lines in Fig. 1, and may also be moved along the axis of the tractor 10, by means now to be described.

Secured outside the side elements 17 of the chassis of tractor 10 are parallel tracks or ways 18 extending lengthwise of the chassis from the cab 13 to the rear end of the chassis. Tracks 18 may be secured and supported in any suitable way as by brackets 19 fixed to side elements 17. A traveler generally indicated at 20 in Fig. 1 is mounted for fore and aft axial movement along the chassis of the tractor 10 in tracks 18. Traveler 20 has side elements 21 carried by supports 22 which in turn carry rollers 23 mounted in tracks 18. In the embodiment illustrated in Fig. 2 the tracks 18 are mounted directly upon the elements 17 and the rollers 23 are carried up stub axles 50 secured to side elements 21. Side elements 21 are joined at their front ends by cross elements 24 and 39. Traveler 20 is moved along tracks 18 by a piston whose rod 25 is secured at one end to cross element 24, said piston being mounted in a cylinder 26 associated with the cab of the tractor 10. Cylinder 26 is supplied with fluid under pressure from any suitable source to actuate piston 25 and is controlled in any suitable way by the driver of the tractor.

Suitably secured to side elements 21 of traveler 20 are upstanding tracks or ways 27. Tracks 27 are parallel and of any suitable height depending upon the elevation necessary to dump the type trailer normally used with the tractor. Rollers 28 are mounted in tracks 27 and in turn carry track extensions 29. Extensions 29 are secured in spaced parallel relationship at their upper ends by a header 30 and at their lower ends by a cross member 31 (Fig. 3). Rollers 32 are mounted in extensions 29 and in turn support side members 33. Side members 33 are secured in spaced parallel relationship at their upper ends by a spacer 34 and at their lower ends by spacers 35 and 36 (Fig. 3). Means in the form of parallel members 37 are secured at the lower ends of members 33 and extend rearwardly therefrom in parallel relation. Members 37 are suitably cross braced as by braces 38 and fifth wheel 16 is suitably secured to their rear ends.

At least one cylinder, here shown as two cylinders 40, are mounted on cross element 39 and extend upwardly parallel to tracks 27. Pistons are mounted in cylinders 40 with their rods 41 secured at their upper ends to the under side of header 30. Cylinders 40 are supplied with fluid under pressure from any suitable source to actuate said pistons and are subject to the control of the driver of the tractor in any suitable way.

Figure 2:
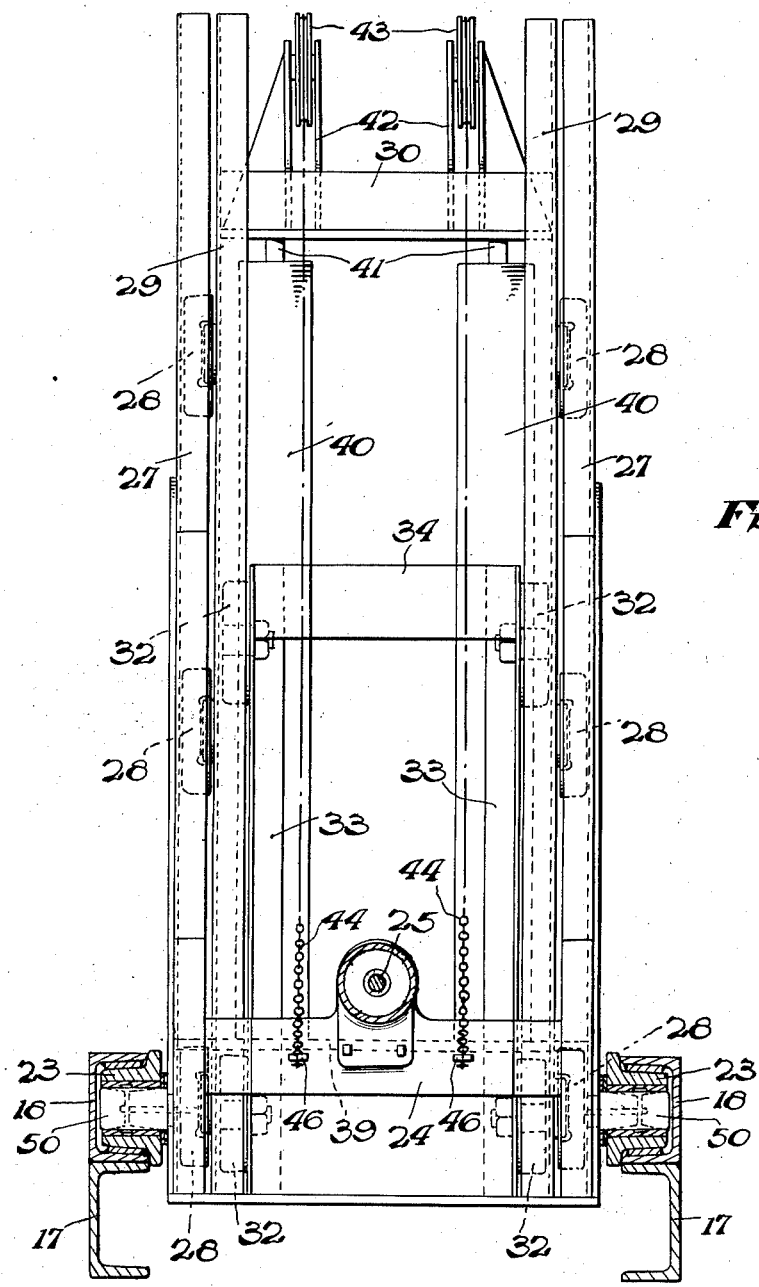

Upstanding brackets 42 are secured and braced to header 30. Journaled in brackets 42 are pulleys or chain wheels 43. Chains 44 pass over pulleys 43 and are secured at one end to spacer 35 as at 45 and at the other end to cross element 24 as at 46 (Fig. 2).

With the fifth wheel elevating mechanism of the present invention assembled as above described and with a trailer 14 mounted on fifth wheel 16, to dump trailer 14 the driver of tractor 10 admits fluid under pressure to cylinders 40 thus forcing the pistons upward. Upward movement of said pistons moves header 30 and extensions 29 upward, rollers 28 moving in tracks 27. Upward movement of header 30 carries pulleys 43 upward, and the chains 44 which are secured to cross element 24 pass over and rotate pulleys 43, and since they are secured to spacer 35 at 45 they raise side members 33, rollers 32 moving in extensions 29. Upward movement of side members 33 elevates members 37 and fifth wheel 16 raising trailer 14 to dumping position.

Elevation of trailer 14 to dumping position normally causes the wheels 15 of trailer 14 to approach the tractor 10 as shown in dotted lines in Fig. 1. If however the load is to be dumped over a bank, wall or the like and forward movement of the trailer during dumping is not desirable the driver can admit fluid under pressure to cylinder 26 as the trailer is being elevated to actuate its piston and move traveler 20 toward the rear of the chassis of the tractor 10 along tracks 18 thus moving fifth wheel 16 rearwardly as it is being elevated. Trailer 14 is then rotated about a fixed horizontal axis of rotation, the line of centers of wheels 15.

After trailer 14 has been dumped the fluid is released from cylinders 40 and the several elements of the fifth wheel elevating mechanism move downwardly to normal position. Thereafter the driver may move traveler 20 and fifth wheel 16 along the tracks 18 by suitable actuation of the piston in cylinder 26 to adjust the center of trailer load on tractor 10 to any desired position. Adjustment of the center of the trailer load by suitable actuation of piston may be accomplished at any time and with the trailer light or loaded to compensate for driving conditions, conditions of the road, conditions of weather and the like.

By the novel fifth wheel elevating mechanism of the present invention there is therefore provided novel means for dumping trailers which is of simple construction, readily installed on any tractor chassis, of simple and convenient operation for untrained personnel and which permits of adjustment of the center of the trailer load on the tractor.

Changes to or modifications of the above described illustrative embodiment of the present invention will now be suggested to those skilled in the art without departing from the present inventive concept. As an example, the several elements of the traveler may be so proportioned and arranged that when in rearmost position the members 37 may be further lowered to the gound to pick up a dropped trailer or for any other desired purpose. Reference should therefore be had to the appended claims to determine the scope of this invention.

What is claimed is:

1. In a mechanism of the type described including a tractor having a chassis, a traveler mounted for fore and aft axial movement on the chassis of the tractor, means mounted on said tractor for moving said traveler lengthwise of the chassis, a fifth wheel mounted for vertical movement on said traveler and means on said traveler for imparting vertical movement to said fifth wheel.

2. In a mechanism of the type described including a tractor having a chassis and a fifth wheel, a traveler mounted for fore and aft axial movement on the chassis of the tractor, means mounted on said tractor for moving said traveler along the chassis lengthwise thereof, means mounted for vertical movement on said traveler and supporting the fifth wheel and means on said traveler for imparting vertical movement to said supporting means.

3. In a mechanism of the type described including a tractor having a chassis and a fifth wheel, a traveler mounted for fore and aft axial movement on the chassis of the tractor, means mounted on said tractor for moving said traveler along the chassis lengthwise thereof, upstanding ways carried by said traveler, means mounted for vertical movement on said ways and supporting the fifth wheel and means on said traveler for imparting vertical movement to said supporting means.

4. In a mechanism of the type described including a tractor having a chassis and a fifth wheel, a traveler mounted for fore and aft axial movement on the chassis of the tractor, means mounted on said tractor for moving said traveler along the chassis lengthwise thereof, upstanding ways carried by said traveler, extension elements mounted for vertical movement on said ways, means mounted for vertical movement on said extension elements and supporting the fifth wheel and means on said traveler for imparting vertical movement to said extension elements and said supporting means.

5. In a mechanism of the type described including a tractor having a chassis and a fifth wheel, a traveler mounted for fore and aft axial movement on the chassis of the tractor, means mounted on said tractor for moving said traveler along the chassis lengthwise thereof, upstanding ways carried by said traveler, extension elements mounted for vertical movement on said ways, means mounted for vertical movement on said extension elements, flexible means secured to said means and passing over said extension elements and secured to said traveler and means on said traveler for imparting vertical movement to said extension elements and through said flexible means to said vertically movable means.

6. A mechanism as described in claim 5 in which the extension elements support rotary means over which the flexible means pass.

7. A mechanism as described in claim 5 in which the chassis of the tractor supports spaced parallel tracks in which the traveler is mounted for fore and aft movement along the chassis.

8. A mechanism as described in claim 5 in which pulleys are journaled in the extension elements and the flexible means includes chains passing over these pulleys.

9. A mechanism as described in claim 5 in which the means for moving the traveler along the chassis includes a cylinder fixed to the chassis and a piston fixed to the traveler and the means for imparting vertical movement to the vertically movable means includes at least one cylinder fixed to the traveler and at least one piston fixed to the extension elements.

10. In a mechanism of the type described including a tractor having a chassis and a fifth wheel, spaced parallel tracks mounted lengthwise on the chassis, a traveler mounted for movement along said tracks, a cylinder mounted on the chassis, a piston in said cylinder and secured to said traveler, upstanding spaced parallel ways carried by said traveler, spaced parallel extension elements mounted for vertical movement on said upstanding ways, pulleys mounted on the tops of said extension elements, means mounted for vertical movement on said extension elements and supporting the fifth wheel, flexible means secured to said means and passing over said pulleys and then secured to said traveler, cylinders mounted on said traveler and pistons in said cylinders secured to said extension elements.

GEORGE R. DEMPSTER.
HARRY W. JONES.

REFERENCES CITED

The following references are of record in the file of this patent:

UNITED STATES PATENTS

| Number | Name | Date |
|---|---|---|
| 1,523,249 | Blum | Jan. 13, 1925 |
| 2,238,237 | Thompson | Apr. 15, 1941 |